(12) United States Patent
Kita

(10) Patent No.: US 6,223,520 B1
(45) Date of Patent: May 1, 2001

(54) GAS TURBINE COMBINED PLANT, METHOD OF OPERATING THE SAME, AND STEAM-COOLING SYSTEM FOR GAS TURBINE HOT SECTION

(75) Inventor: Yoshiyuki Kita, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/255,723

(22) Filed: Feb. 23, 1999

(30) Foreign Application Priority Data

Feb. 25, 1998 (JP) ................................................ 10-043790

(51) Int. Cl.⁷ .................................................. F02C 13/10
(52) U.S. Cl. ............................................................ 60/39.02
(58) Field of Search ............................ 60/39.182, 39.75, 60/39.05, 39.19, 39.53, 39.54, 39.58; 415/115

(56) References Cited

U.S. PATENT DOCUMENTS

| | | | |
|---|---|---|---|
| 3,879,616 | * | 4/1975 | Baker et al. ............................ 290/40 |
| 3,930,367 | * | 1/1976 | Gasparoli ............................ 60/39.18 |
| 4,424,668 | * | 1/1984 | Mukherjee ........................ 60/39.182 |
| 5,170,622 | * | 12/1992 | Cheng ................................. 60/39.05 |
| 5,412,937 | * | 5/1995 | Tomlinson et al. .................. 60/39.02 |
| 5,428,950 | * | 7/1995 | Tomlinson et al. .................. 60/39.02 |
| 5,444,972 | * | 8/1995 | Moore ................................ 60/39.182 |
| 5,471,832 | * | 12/1995 | Sugita et al. ........................ 60/39.141 |
| 5,579,631 | * | 12/1996 | Chen et al. .......................... 60/39.05 |
| 5,613,356 | * | 3/1997 | Frutschi .............................. 60/39.02 |
| 5,617,716 | * | 4/1997 | Schreiber et al. ................... 60/39.05 |
| 5,775,091 | * | 7/1998 | Bannister et al. .................. 60/39.05 |
| 5,778,657 | * | 7/1998 | Ohtomo et al. ................... 60/39.182 |
| 5,953,900 | * | 9/1999 | Bannister et al. .................. 60/39.05 |
| 5,992,138 | * | 11/1999 | Bruckner et al. ................... 60/39.02 |
| 6,109,019 | * | 8/2000 | Sugishita ........................... 60/39.182 |
| 6,116,017 | * | 9/2000 | Mori et al. ........................ 60/39.182 |
| 6,128,895 | * | 10/2000 | Takahama et al. ............... 60/39.182 |

FOREIGN PATENT DOCUMENTS 9-166002    6/1997    (JP) .

* cited by examiner

*Primary Examiner*—Timothy S. Thorpe
*Assistant Examiner*—W. Rodriguez
(74) *Attorney, Agent, or Firm*—Sughrue, Mion, Zinn, Macpeak & Seas, PLLC

(57) ABSTRACT

A gas turbine combined plant, a method of operating the same, and a steam-cooling system for a gas turbine hot section are provided, whereby the generation of thermal stress can be utmost reduced. A gas turbine hot section steam cooling system (30) is designed to cool a hot section (8) of a gas turbine unit (1) by the steam of an exhaust heat recovery boiler (2) and to supply the steam after cooling into a steam turbine (23). The system (30) comprises: a temperature detectors (15, 16) for detecting the outlet temperature of the steam of the gas turbine hot section and the outlet temperature of the steam of the exhaust heat recovery boiler, respectively, at the start-up time of the gas turbine; and a shielding valve (20) disposed to a pipe (12a) supplying the steam after cooling the gas turbine hot section to the steam turbine for shielding the steam after cooling in the case where there is a substantial difference between the both temperature levels. A regulating valve (19) is disposed to the pipe (19a) connecting the gas turbine hot section to a condenser (11) such that the steam after cooling may be recovered to the condenser in the case where there is a substantial difference between the both temperature levels.

7 Claims, 2 Drawing Sheets

GAS TURBINE COMBINED PLANT, METHOD OF OPERATING THE SAME, AND STEAM-COOLING SYSTEM FOR GAS TURBINE HOT SECTION

BACKGROUND OF THE INVENTION

1. Field of the Invention

The present invention relates to a so-called gas turbine combined plant or a combined-cycle plant and a method of operating the same. The present invention further relates to a steam-cooling system for a hot section in a gas turbine in which the hot section such as a combustor in the gas turbine of the combined-cycle plant may be cooled by steam from an exhaust heat recovery boiler as an example.

2. Description of the Related Art

Hitherto, air has been utilized to cool hot sections or elements such as combustors in gas turbines. However, with a need for higher combustion temperature levels, there has been developed a method of cooling these elements by steam. Furthermore, a plan has been undertaken in which gas turbines containing the hot sections to be cooled by steam are applied to a combined-cycle plant and combined with steam turbines, thereby providing a high efficient power plant.

FIG. 2 is a schematic view showing an example of a gas turbine steam system in conventional combined-cycle plants. In FIG. 2, an exhaust gas from a gas turbine 1 is delivered into an exhaust heat recovery boiler 2. The steam from a high-pressure drum 5 in the exhaust heat recovery boiler 2 is delivered into a high-pressure steam turbine 3 through a high-pressure superheater 6 and a high-pressure steam governing valve 13. On the other hand, the steam from an intermediate-pressure drum 9 in the exhaust heat recovery boiler 2 is delivered into an intermediate-pressure steam turbine 4 through an intermediate-pressure superheater 10, a reheater 7, and an intermediate-pressure steam governing valve 14 in the order named.

The steam is then supplied to a hot section 8 from a cooling steam source 12, and is used to cool the hot section 8. Auxiliary steam of the power plant or the steam (for example, the steam at the outlet of the intermediate-pressure superheater 10) in the exhaust heat recovery boiler 2 may be used as the cooling steam source 12. The steam after cooling is then confluent with the steam at the outlet of the reheater 7 to be fed together to the intermediate-pressure steam turbine 4 through the intermediate-pressure steam governing valve 14, as described above.

Such a combined-cycle plant is provided with a system having the following arrangement. During starting up the plant or at the start-up time of the gas turbine unit 1, the steam temperature detected at a hot section outlet steam temperature detector 15 and the steam temperature detected by a reheater outlet steam temperature detector 16 are both too low to allow the steam to be effectively directed to the intermediate-pressure steam turbine 4. Thus, an intermediate-pressure steam turbine inlet steam temperature detector 22 is provided to a pipe connected to the intermediate-pressure steam governing valve 14, and detects the steam temperature thereof. While the intermediate-pressure steam governing valve 14 is held closed based upon this detection signal, the steam can by-pass from a turbine by-pass valve 18 to a condenser 11. When the steam temperature rises to reach a tolerance, the intermediate-pressure steam governing valve 14 is then opened based upon the detection signal from the intermediate-pressure steam turbine inlet steam temperature detector 22, resulting in starting up the intermediate-pressure steam turbine 4.

However, while the temperature rises as described above, it has been found that, in a certain period, the temperature detected by the hot section outlet steam temperature detector 15 may be kept considerably higher in rising ratio than the temperature detected by the reheater outlet steam temperature detector 16. This fact indicates that there occurs a large difference between both the outlet steam temperature levels. Accordingly, there is a fear that an undesirable thermal stress be generated at the point, or in the vicinity thereof, where the pipe extending from the reheater 7 and the pipe extending from the hot section 8 are confluent with each other.

SUMMARY OF THE INVENTION

The present invention has been made to overcome the foregoing problem, and an object of the present invention is therefore to provide a gas turbine unit combined plant, a method of operating the same, and a steam-cooling system for a gas turbine hot section, whereby the occurrence of such an undesirable thermal stress can be utmost reduced.

In terms of the above object, a gas turbine combined plant in an aspect of the present invention comprises: a first path directing steam from an exhaust heat recovery boiler to a steam turbine unit; a second path branched from the first path, connected to a condenser through a first valve unit; and a third path directing steam after cooling a gas turbine hot section to the first path, wherein a second valve unit is disposed to the third path (assuming that a part of the third path which joins the steam to the first path be provided onto the third path), and the gas turbine combined plant further comprises a fourth path connected to the condenser through a third valve unit from the point located at the upstream side of the second valve unit disposed to the third path.

According to another aspect of the present invention, a gas turbine combined plant comprises a controller connected to the first valve unit, the second valve unit, and the third valve unit, wherein the first valve unit, the second valve unit, and the third valve unit are opened/closed under the control of the controller.

According to still another aspect of the present invention, a gas turbine combined plant further comprises a first steam temperature detector disposed to the first path for detecting the outlet temperature of the steam of the exhaust heat recovery boiler, and a second steam temperature detector disposed to the third path for detecting the outlet temperature of the steam of the gas turbine hot section, the first steam temperature detector and the second steam temperature detector both being connected to the controller.

According to still another aspect of the present invention, a gas turbine combined plant further comprises a steam turbine inlet steam temperature detector disposed to the first path at the downstream side of the point where the second path is branched from the first path, and a fourth valve unit disposed to the first path at the downstream side of the steam turbine inlet steam temperature detector, the steam turbine inlet steam temperature detector and the fourth valve unit being connected to the controller.

Preferably, a gas turbine combined plant according to still another aspect of the present invention further comprises a hot section outlet steam pressure detector for detecting the outlet steam pressure of the gas turbine hot section which occurs at the upstream side of the point where the fourth path is branched from the third path, the hot section outlet steam pressure detector being connected to the controller.

Further, in order to attain the above-noted object, the present invention provides a method of operating a gas turbine combined plant for introducing the steam after cooling a gas turbine hot section to a path directing steam from an exhaust heat recovery boiler into a steam turbine. The method comprises the steps of: detecting the temperature of the steam from the exhaust heat recovery boiler and the temperature of the steam after cooling the gas turbine hot section; and directing a part or the whole steam after cooling the gas turbine hot section to a condenser in the case where the detected temperature has a difference equal to a predetermined value or more.

According to a further aspect of the present invention, there is provided a gas turbine hot section steam-cooling system for cooling a hot section of a gas turbine by steam from an exhaust heat recovery boiler and supplying the steam after cooling to a steam turbine. The system comprises: a first temperature detector for detecting the outlet temperature of the steam of the hot section of the gas turbine, and a second temperature detector for detecting the outlet temperature of the steam of the exhaust heat recovery boiler at the start-up time of the gas turbine; a shielding valve disposed to a pipe supplying the steam after cooling to the steam turbine from the hot section of the gas turbine for shielding the steam after cooling in the case where there is a substantial difference between the temperature detected by the first temperature detector and the temperature detected by the second temperature detector; and a regulating valve disposed to a pipe connecting the hot section of the gas turbine to a condenser for recovering the steam after cooling to the condenser in the case where there is a substantial difference between the temperature detected by the first temperature detector and the temperature detected by the second temperature detector.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENT

Figure 1:
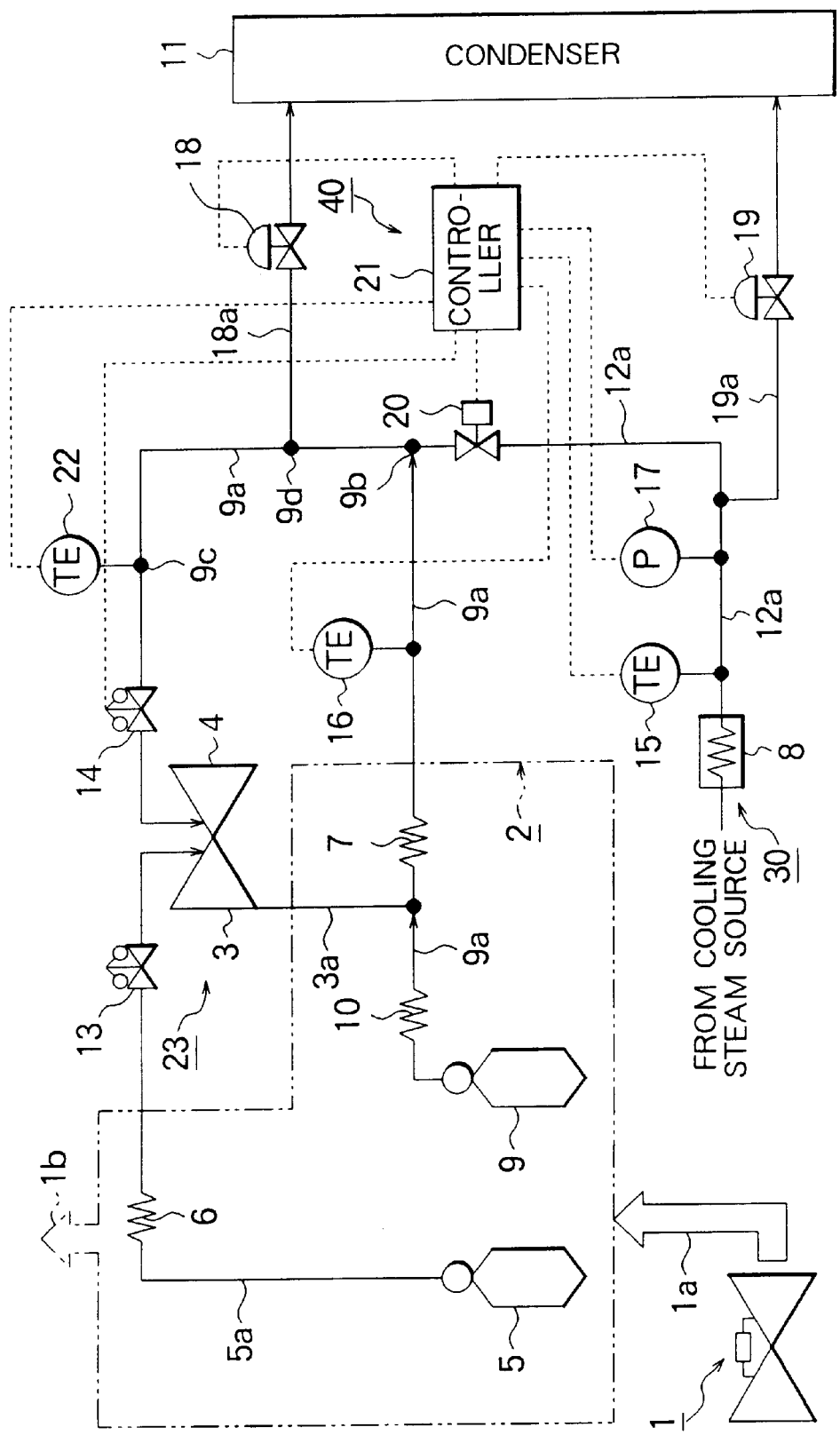
FIG. 1 is a steam system diagram showing a gas turbine combined plant incorporating a steam-cooling system for a gas turbine hot section in accordance with the present invention.
Figure 2:
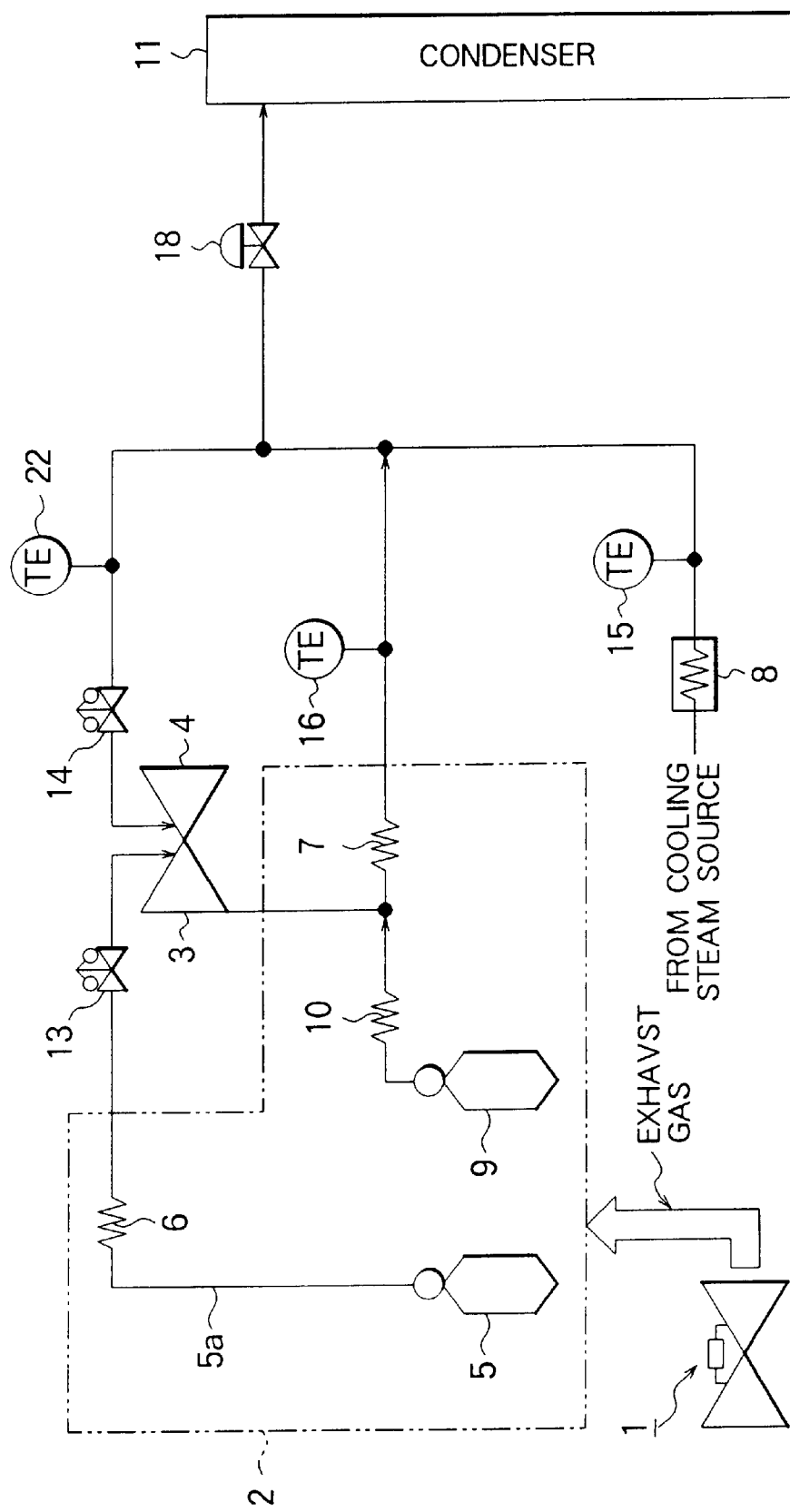
FIG. 2 is a steam system diagram showing a conventional gas turbine combined plant.

A preferred embodiment of the present invention will now be described in detail with reference to the accompanying drawings. Throughout the drawings, the same reference numerals represent the same or corresponding elements.

FIG. 1 illustrates a gas turbine combined plant or a combined-cycle plant incorporating a preferred embodiment of a steam-cooling system for a gas turbine in accordance with the present invention. There is essentially shown in the figure a gas turbine unit 1, an exhaust heat recovery boiler 2, a steam turbine unit 23, and the like which all constitute a combined-cycle plant, a steam-cooling system 30, and a control system 40. For the purpose of a simple description, illustration of known elements is omitted and only the elements essential for understanding the present invention is shown. It should be appreciated that these omitted elements also make up this combined-cycle plant.

Referring to FIG. 1, an exhaust gas 1a from the gas turbine unit 1 which has driven a generator (not shown) is fed to the exhaust heat recovery boiler 2 to be used for occurrence of steam. The gas is thereafter exhausted from the exhaust heat recovery boiler 2, as depicted by an arrow 1b. The exhaust heat recovery boiler 2 comprises a high-pressure drum 5, and an intermediate-pressure drum 9. A high-pressure superheater 6 and a high-pressure steam governing valve 13 are both connected to a steam pipe 5a that extends beyond the high-pressure drum 5, and the steam pipe 5a is connected to a steam inlet port of a high-pressure steam turbine 3 within the steam turbine unit 23. On the other hand, an intermediate-pressure superheater 10, a reheater 7, and an intermediate-pressure steam governing valve (a fourth valve unit) 14 are in turn connected to a steam pipe (a first path) 9a that extends beyond the intermediate-pressure drum 9. The steam pipe 9a is connected to a steam inlet port of an intermediate-pressure steam turbine 4 within the steam turbine unit 23. Further, a pipe 3a extending beyond an exhaust gas outlet port of the high-pressure steam turbine 3 is connected to the steam pipe 9a at the point located between the intermediate-pressure superheater 10 and the reheater 7, as illustrated in the figure.

A hot section 8, for example, which may be a combustor of a gas turbine, a hot part, is disposed to a pipe (a third path) 12a in the steam-cooling system 30 which is connected to a cooling steam source 12. A shielding valve (a second valve unit) 20 is also connected to the pipe 12a. The pipe 12a is further confluent with the pipe 9a at the confluence point 9b located at the downstream side of the shielding valve 20 relative to the direction where the steam flows in the pipe 12a. Auxiliary steam of the power plant or steam from the exhaust heat recovery boiler 2 (e.g., the steam at the outlet of the intermediate-pressure superheater 10) is suitably used as the cooling steam source 12.

Furthermore, a pipe (a second path) 18a having a turbine by-pass valve (a first valve unit) 18 is branched from the pipe 9a at the midpoint 9d located between the confluence point 9b and a point 9c to which the intermediate-pressure steam turbine inlet steam temperature detector 22 is attached, and is then connected to a condenser 11. A pipe (a fourth path) 19a having a regulating valve (a third valve unit) 19 is connected at one end to the condenser 11. The pipe 19a is also connected at the other end to the pipe 12a at the downstream side of a hot section outlet steam temperature detector 15.

A hot section outlet steam pressure detector 17 is disposed to the pipe 12a. Based upon the signal representing the steam pressure detected by the detector 17, the opening/closing control of the regulating valve 19 can be carried out by an optional controller 21 constituting the control system 40. The output signals from the hot section outlet steam temperature detector 15, reheater outlet steam temperature detector 16, hot section outlet steam pressure detector 17, intermediate-pressure steam turbine inlet steam temperature detector 22, and the like are also inputted to the controller 21. Therefore, not only the regulating valve 19 but also the intermediate-pressure steam governing valve 14, the turbine by-pass valve 18, and the shielding valve 20 may be operated in the opening/closing manner under the control of the controller 21.

Preferably, the controller 21 is a microcomputer, and can activate a valve driver contained in each valve according to the command from the microcomputer to perform the opening/closing operations for the valves by a known method. Instead, it goes without saying that a known electric sequence circuit may be used in the controller 21. For programming of such a microcomputer or sequence circuit, a further description will be omitted because persons having ordinary skills in the art can be easy to construct it.

Now, the operation of the combined-cycle plant having the foregoing arrangement will be described with reference to FIG. 1. When the gas turbine unit 1 is started up, the hot section outlet steam temperature detector 15 detects a hot section outlet steam temperature which may rise in a relatively short period. On the other hand, the reheater outlet steam temperature detector 16 detects a reheater outlet steam temperature which may rise more slowly in a relative manner correspondingly by virtue of the heat capacity of the exhaust heat recovery boiler 2. The output signals indicating the above-noted steam temperature are transmitted to the controller 21, where the difference in temperature level between the both output signals is sensed by a comparator (not shown) in the regulating valve 21. When the presence of the temperature difference is sensed, then, a command of opening the regulating valve 19 and a command of closing the shielding valve 20 are issued. Therefore, the steam heated at a high temperature by the hot section 8 is fed through the pipes 12a and 19a to the regulating valve 19, and then recovered into the condenser 11. At this time, the opening degree of the regulating valve 19 can be adjusted based upon the output signals from the hot section outlet steam pressure detector 17, so that the steam passing through the pipe 12a serves as a cooling steam with sufficient volume for properly cooling the hot section 8. When the steam at the outlet of the exhaust heat recovery boiler 2 or, more specifically, the steam from the reheater 7 does not meet with the temperature condition to be delivered to the intermediate-pressure turbine 4, similarly, it is passed through the pipes 9a and 18a to the turbine by-pass valve 18, and is then recovered into the condenser 11.

While the start-up process further proceeds, the reheater outlet steam temperature detected by the reheater outlet steam temperature detector 16 may rise to approach the hot section outlet steam temperature detected by the hot section outlet steam temperature detector 15, and then reach substantially the value equal thereto. Alternatively, the reheater outlet steam temperature may reach such a value as to bring the temperature difference to such an extent that no undesirable thermal stress would occur at the pipe portion of the confluence point 9b or in the vicinity thereof, etc. if the both steams are confluent with each other at the confluence point 9b. When it reaches the above-mentioned values, the shielding valve 20 is opened under the control of the controller 21, while the regulating valve 19 is closed stepwise. Then, a part or the whole steam at the outlet of the hot section is permitted to pass to the intermediate-pressure steam governing valve 14 via the pipes 12a and 9a. The confluent steam is recovered into the condenser 11 through the opened turbine by-pass valve 18 until the above-described temperature condition or ventilation condition is established for ventilation to the intermediate-pressure steam turbine 4, that is, until the steam temperature detected by the intermediate-pressure steam turbine inlet steam temperature detector 22 comes to such a temperature value. Once the ventilation condition for the intermediate-pressure steam turbine 4 is established, the intermediate-pressure steam governing valve 14 is opened while the turbine by-pass valve 18 is closed, and then the steam is allowed to pass to the intermediate-pressure steam turbine 4.

Now, a description will be given to an operation of the present invention.

According to a first aspect of the present invention, a gas turbine combined plant comprises: a first path directing steam from an exhaust heat recovery boiler to a steam turbine unit; a second path branched from the first path, connected to a condenser through a first valve unit; and a third path directing steam after cooling a gas turbine hot section to the first path, wherein a second valve unit is disposed to the third path, and the gas turbine combined plant further comprises a fourth path connected to the condenser through a third valve unit from the point located at the upstream side of the second valve unit disposed to the third path. Therefore, in the case where the temperature of the steam after cooling the gas turbine in the third path is higher than the temperature of the steam in the first path, the second valve unit disposed to the third path is closed while the third valve unit disposed to the fourth path is opened. As a result, since the steam after cooling may be recovered into the condenser, undesirable thermal stress will be prevented from occurring at the confluent point of the first path and the third path or in the vicinity thereof.

Further, according to a second aspect of the present invention, a gas turbine combined plant comprises a controller connected to the first valve unit, the second valve unit, and the third valve unit, wherein the first valve unit, the second valve unit, and the third valve unit are opened/closed under the control of the controller. With such an arrangement, the opening/closing operation for each valve unit can be electrically carried out, and thereby reducing the labor cost.

Further, according to a third aspect of the present invention, a gas turbine combined plant comprises a first steam temperature detector disposed to the first path for detecting the outlet temperature of the steam of the exhaust heat recovery boiler, and a second steam temperature detector disposed to the third path for detecting the outlet temperature of the steam of the gas turbine hot section, the first steam temperature detector and the second steam temperature detector both being connected to the controller. For this reason, the opening/closing operation for each valve unit can be electrically carried out, thereby reducing the labor cost.

Further, according to a fourth aspect of the present invention, a gas turbine combined plant comprises a steam turbine inlet steam temperature detector disposed to the first path at the downstream side of the point where the second path is branched from the first path, and a fourth valve unit disposed to the first path at the downstream side of the steam turbine inlet steam temperature detector, the steam turbine inlet steam temperature detector and the fourth valve unit being connected to the controller. For this reason, in case of unsuitable temperature condition for ventilating the steam after cooling to the steam turbine, the signals indicating this fact are transmitted to the controller from the steam turbine inlet steam temperature detector. Then, while the fourth valve unit is held closed, the first valve unit is opened. This allows the steam after cooling to be recovered into a condenser. As a result, in the case where there is no substantial temperature difference between the steam in the first path and the steam after cooling the gas turbine in the third path, such inconvenience can be avoided that steam in a low temperature level may be delivered into the steam turbine.

Further, according to a fifth aspect of the present invention, a gas turbine combined plant comprises a hot section outlet steam pressure detector for detecting the outlet steam pressure of the gas turbine hot section which occurs at the upstream side of the point where the fourth path is branched from the third path, the hot section outlet steam pressure detector being connected to the controller. With such an arrangement, the opening degree of the third valve unit will be adjustable depending upon the outlet steam pressure of the gas turbine hot section which is detected by the hot section outlet steam pressure detector. This enables the hot section to be effectively cooled.

Further, according to a six aspect of the present invention, a gas turbine combined plant is operated to detect the temperature of the steam from the exhaust heat recovery boiler and the temperature of the steam after cooling the gas turbine hot section and to direct a part or the whole steam after cooling the gas turbine hot section to a condenser in the case where the detected temperature has a difference equal to a predetermined value or more. This will prevent the occurrence of undesirable thermal stress because the steam after cooling does not flow to the steam turbine side and be recovered into the condenser.

Further, according to a seventh aspect of the present invention, a steam-cooling system for a gas turbine hot section having an arrangement in a gas turbine combined plant incorporates such a steam-cooling system for the gas turbine hot section. With such an arrangement, an undesirable thermal stress may be prevented from occurring at the point where the steam after cooling flowing from the gas turbine hot section steam-cooling system is confluent with the steam flowing to a steam turbine system.

Accordingly, although the preferred embodiment of the present invention has been described, it is not intended to limit the present invention thereto. It goes without saying that various modifications will be available within the definition set forth in the appended claims for patent without departing from the spirit and the scope of the present invention.

What is claimed is:

1. A gas turbine combined plant comprising:

a first path for directing steam from an exhaust heat recovery boiler to a steam turbine unit;

a second path branched from said first path and connected to a condenser through a first valve unit; and a third path for directing steam after cooling a gas turbine hot section to said first path, wherein a second valve unit is disposed to said third path, and said gas turbine combined plant further comprises a fourth path connected to said condenser through a third valve unit from the point located at the upstream side of said second valve unit disposed to said third path.

2. A gas turbine combined plant as claimed in claim 1, further comprising a controller connected to said first, second and third valve units so that said first, second and third valve units are opened/closed under the control of said controller.

3. A gas turbine combined plant as claimed in claim 2, further comprising a first steam temperature detector disposed to said first path for detecting the outlet temperature of the steam of said exhaust heat recovery boiler, and a second steam temperature detector disposed to said third path for detecting the outlet temperature of the steam of said gas turbine hot section, said first steam temperature detector and said second steam temperature detector both being connected to said controller.

4. A gas turbine combined plant as claimed in claim 2, further comprising a steam turbine inlet steam temperature detector disposed to said first path at the downstream side of the point where said second path is branched from said first path, and a fourth valve unit disposed to said first path at the downstream side of said steam turbine inlet steam temperature detector, said steam turbine inlet steam temperature detector and said fourth valve unit being connected to said controller.

5. A gas turbine combined plant as claimed in claim 2, further comprising a hot section outlet steam pressure detector for detecting the outlet steam pressure of said gas turbine hot section which occurs at the upstream side of the point where said fourth path is branched from said third path, said hot section outlet steam pressure detector being connected to said controller.

6. A method of operating a gas turbine combined plant for introducing the steam after cooling a gas turbine hot section to a path for directing steam from an exhaust heat recovery boiler into a steam turbine, said method comprising the steps of: detecting the temperature of the steam from said exhaust heat recovery boiler and the temperature of the steam after cooling said gas turbine hot section; and directing a part or the whole steam after cooling said gas turbine hot section to a condenser when the detected temperature has a difference equal to a predetermined value or more.

7. A gas turbine hot section steam-cooling system for cooling a hot section of a gas turbine by steam from an exhaust heat recovery boiler and supplying the steam after cooling to a steam turbine, said system comprising: a first temperature detector for detecting the outlet temperature of the steam of said hot section of said gas turbine, and a second temperature detector for detecting the outlet temperature of the steam of said exhaust heat recovery boiler at the start-up time of said gas turbine; a shielding valve disposed to a pipe for supplying the steam after cooling to said steam turbine from said hot section of said gas turbine for shielding the steam after cooling if there is a substantial difference between the temperature detected by said first temperature detector and the temperature detected by said second temperature detector; and a regulating valve disposed to a pipe connecting said hot section of said gas turbine to a condenser for recovering the steam after cooling to said condenser if there is a substantial difference between the temperature detected by said first temperature detector and the temperature detected by said second temperature detector.

* * * * *